United States Patent [19]

Dockery et al.

[11] Patent Number: 5,585,010
[45] Date of Patent: Dec. 17, 1996

[54] AQUATIC TANK FILTERING SYSTEM

[76] Inventors: Daryl Dockery; Denzel Dockery, both of P.O. Box 168, Ponce de Leon, Fla. 32455

[21] Appl. No.: 491,727

[22] Filed: Jun. 19, 1995

[51] Int. Cl.[6] ................................................. A01K 63/04
[52] U.S. Cl. ..................... 210/805; 210/169; 210/94; 210/136; 210/416.2; 119/2.59
[58] Field of Search ...................................... 210/169, 805, 210/416.2, 94, 136, 137, 232, 244, 245, 246, 282, 472, 484, 503; 119/259, 260, 261

[56] References Cited

U.S. PATENT DOCUMENTS

| | | | |
|---|---|---|---|
| 4,186,093 | 1/1980 | Willinger | 210/169 |
| 4,421,644 | 12/1983 | Gedye | 210/169 |
| 4,622,148 | 11/1986 | Willinger | 210/169 |
| 5,277,800 | 1/1994 | Dieckmann et al. | 210/169 |

Primary Examiner—Robert J. Popovics
Attorney, Agent, or Firm—George A. Bode; Michael L. Hoelter

[57] ABSTRACT

A filtering apparatus for use generally in filtering the fluid of an aquarium. It consists of a clear housing that is submerged within the tank with this housing having both intake and discharge openings therein for the passage of fluid therethrough. This housing is further configured with a series of channels formed therein for directing the flow of fluid within the housing to the filter. A removable filter is mounted within the housing and is coupled to the discharge opening which, in turn, is coupled to a pump. The housing is openable so that access to the filter is provided when the filter needs to be replaced. Also, adjacent each intake opening is a flap to permit only one-way flow across the intake openings and into the housing.

20 Claims, 5 Drawing Sheets

AQUATIC TANK FILTERING SYSTEM

BACKGROUND OF THE INVENTION

1. Field of the Invention

This invention pertains to filtering systems in general and more particularly to a fluid filtering system primarily for use in aquatic tanks and the like.

2. General Background

Many different types of fluid filters currently exist, and especially those for use in aquatic tanks and the like. A typical example is U.S. Pat. No. 4,072,612 issued to Daniel. This patent discloses an aerator for water that incorporates a submerged water intake having a filter built therein.

U.S. Pat. No. 4,552,657 issued to Ogawa discloses a circular housing that rests upon the tank bottom and which is configured with upper and lower filtration chambers therein. The lower chamber encloses a coarse filter material which also serves as a weight while the upper chamber supports a circular corrugated filter material therein. Both upper and lower filtration chambers contain suction ports through which fluid passes into the housing prior to being cleaned and discharged out the top of the housing. An air pump is also secured to the housing to supply air thereto.

U.S. Pat. No. 4,783,258 issued to Willinger, et al., pertains to a filter cartridge that consists of a reusable framework that is surrounded by a replaceable filter envelope. This framework is designed to encourage the propagation of aerobic bacteria thereon and it is configured such that the surrounding envelope may be removed and replaced without affecting such propagation. This cartridge is generally mounted or inserted within a housing through which fluid is pumped. Alternatively, this cartridge may simply be placed within a tank across a flow stream generated by a pump.

U.S. Pat. No. 5,139,656 issued to Gonnello pertains to a filtering apparatus having a housing with an open top that is securely mounted inside a tank. The open top receives the fluid to be filtered which passes down into a separate compartment of the housing that contains a filtering medium. Cleaned fluid is removed from the housing via a pump secured to a lower region of the housing.

U.S. Pat. No. 5,164,089 issued to Preston discloses an aquarium filter which consists of an open foam filter body surrounding an internal cavity. A pipe passes through this filter body and terminates below the surface of the fluid. An aerator tube passes through this pipe and discharges air near the end of the pipe positioned within the cavity. By the force of the air rising up through the pipe, fluid is drawn into the pipe from within the cavity. This causes fluid to pass through the filter body so as to replace the fluid in the cavity that rises through the pipe and which is discharged outside the filter body. This filter body is supported some distance away from the walls of the aquarium so as to permit fluid to flow through all sides of the filter body.

U.S. Pat. No. 5,171,438 issued to Korcz discloses an aquarium filtering system that incorporates chemical filtration. This filtering system utilizes a series of chambers filled with high-density filter elements. These filter elements encourage the propagation of both aerobic and anaerobic bacteria colonies which are used for filtering purposes.

U.S. Pat. No. 5,207,900 issued to Findell discloses a contoured single-piece sponge that is used in conjunction with convention air lines, bubble tubes and stem sockets for filtering an aquarium. The contoured shape of the sponge increases the surface area usable for filtration as the fluid is drawn through the sponge.

U.S. Pat. No. 5,277,800 issued to Dieckmann, et al., pertains to an aquarium filter system that positions the pump inside the aquarium below the surface of the fluid. The pump (in a watertight chamber) causes the aquarium fluid to be drawn through different chambers of the filter system, through a filtering medium, and out a discharge chute.

U.S. Pat. No. 5,228,986 issued to Ellis, et al., pertains to an aquarium filter mounted on a wall of the tank. This system includes a plurality of filter chambers each containing a filter therein. A pump mounted nearby pumps water from the tank into a passageway which is in communication with each of the filter chambers.

While each of these filtering systems may function as specified and provide the user with the desired degree of filtration, it is an object of this invention to provide a new means of filtering the fluid contained within an aquarium.

It is thus an object of this invention to provide a means of inserting a removable and replaceable filter medium within a housing and submerging this housing within the aquarium.

Another object of this invention is to provide a means of restricting the intake ports, thereby limiting the area through which fluid may enter the housing.

Still another object of this invention is to provide a means of channelling the fluid once it enters the housing for maximum filtration thereof.

Yet another object of this invention is to prevent any fluid from exiting the housing through the intake openings once it enters same.

Another object of this invention is to prolong the pathway through which the fluid passes once inside the housing for increased removal of contaminants therefrom.

Still another object of this invention is to provide a quick and easy manner of replacing the filter medium when it becomes time to do so.

A further object of this invention is to provide a means of replacing the filter medium in a clean and sanitary manner without much mess, spillage, or leakage therefrom. These and other objects and advantages of this invention will become obvious upon further investigation.

SUMMARY OF THE PRESENT INVENTION

The preferred embodiment of the apparatus of the present invention solves the aforementioned problems in a straightforward and simple manner. This invention pertains to a filtering apparatus used for filtering a fluid. It consists of a generally clear openable housing that encloses a filter and at least one intake opening in the housing for the passage of fluid therethrough. One way flow control means adjacent the intake openings restrict the fluid flow across the inlet openings and permit only flow into the housing. This housing is also formed with a series of channels therein for directing fluid flow within the housing and towards the filter. This filter contains an outer filter membrane across which the fluid flows and an inner mesh through which the fluid travels. This inner mesh biases the outer filter membrane and prevents this outer membrane from collapsing. A discharge port is coupled to the filter with this discharge port extending out of the housing. A coupling is secured to this discharge port at its distal end for coupling to a pump.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 1:
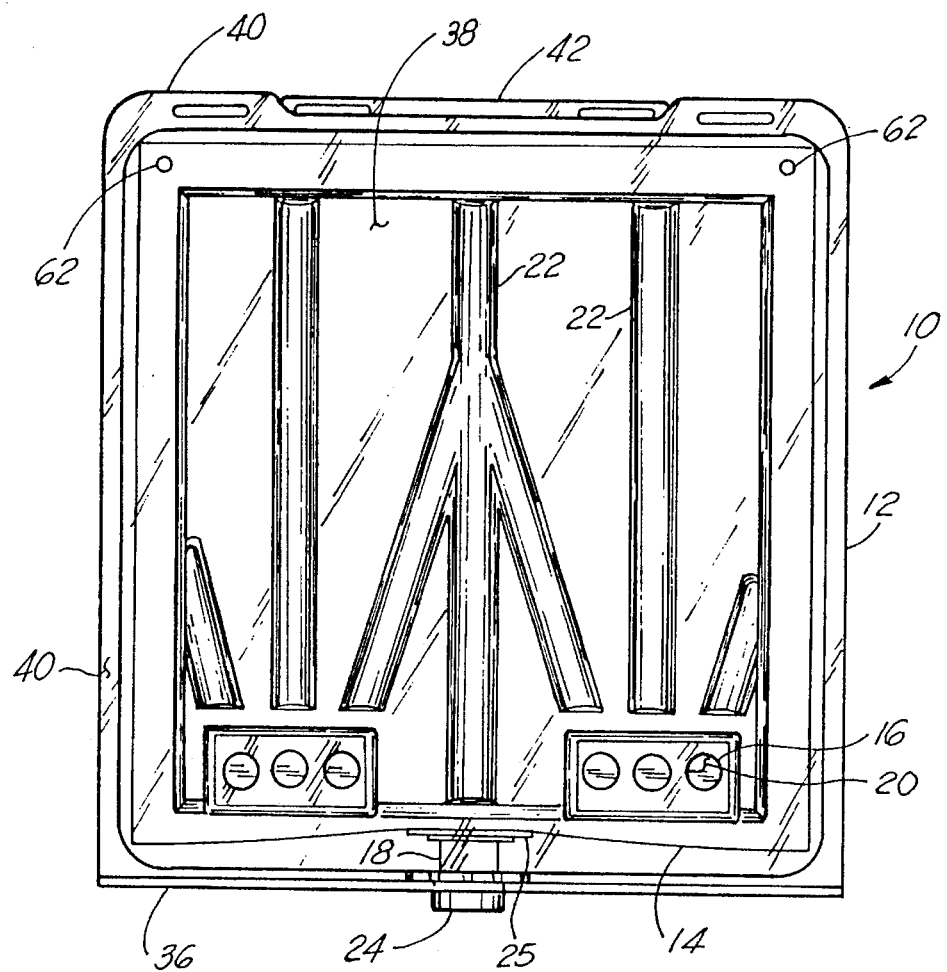
FIG. 1 is a front elevational view of the aquatic tank filter having a container and filtering element.

Referring initially to FIGS. 1–7, there is shown aquatic tank filter system 10 which incorporates housing 12 surrounding filter 14. As shown, filter system 10 is generally triangular and truncated in shape, but it can also be constructed of any other shape that may be desired. Housing 12 is generally constructed of a clear, fluid impervious material so that the condition of filter 14 can readily be observed. Housing 12 is also configured with a plurality of intake openings 16 in one end thereof and generally a single exit or discharge port 18 in the other end thereof. Preferably, intake openings 16 will be one-way openings permitting fluid to enter housing 12, but preventing its escape from housing 12. This can be accomplished by installing a flap or other flow restriction means 20 across each opening 16 to serve as a check valve or the like.

If flap 20 is incorporated as the flow restriction means, this flap 20 can be secured to housing 12 just above openings 16 in the normal fashion, thereby hanging down across openings 16. Thus, as fluid enters openings 16, flaps 20 will pivot into housing 12, but if any fluid attempts to leave housing 12 via openings 16, flaps 20 will be pushed against these openings 16, thereby closing them and preventing any such escape. Flaps 20 will, of course, need to be constructed of a fluid impervious flexible material.

Housing 12 is also constructed having a series of generally parallel concave notches or channels 22 formed into both its front and rear sides. These notches 22, which extend or project within housing 12, help channel the fluid passing through housing 12, thereby providing some guidance for the passage of such fluid through housing 12.

Secured to the bottom of housing 12 is discharge port 18. Discharge port 18 extends between filter 14 within housing 12 and end fitting 24 outside of housing 12. Within housing 12, filter 14 is removably secured to discharge port 18 in the normal fashion such as by being pressed or threaded around discharge port 18. Sometimes, filter 14 will include a small matching fitting 25 for this purpose. End fitting 24 outside of housing 12 is configured for coupling with a small pipe or flexible tubing 26 (seen in FIG. 8). Such coupling may be accomplished in the conventional manner such as by a friction or screw fitting so that this coupling is leak-proof.

Figure 7:
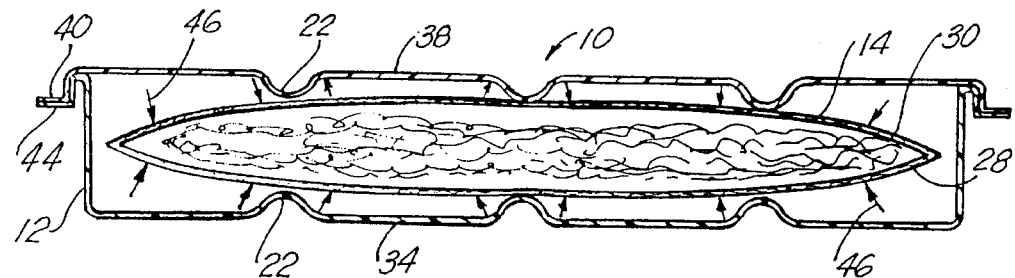
FIG. 7 is a sectional view of the invention taken along Line 7—7 of FIG. 2.

Replaceable filter 14 within housing 12 generally consists of an outer filter membrane 28 surrounding an inner medium or mesh 30 (see FIG. 7). In some embodiments however, inner medium or mesh 30 does not necessarily function as a filter, instead its function is to retain the generally rectangular shape of outer filter membrane 28 and to prevent this outer membrane 28 from collapsing during use. In this capacity, inner medium or mesh 30 can consist of a loose collection of elongated fibers that are molded or otherwise held together. Thus, they provide sufficient bias to retain the shape of outer membrane 28 while not impeding the flow through filter 14.

Outer filter membrane 28 is generally a fabric like material that it is capable of removing small impurities from the fluid entering housing 12 while not significantly contributing to any pressure loss within system 10. This is accomplished by constructing filter membrane 28 of a somewhat loose weave and by providing a large surface area across which the fluid may pass. Both filter membrane 28 and inner medium 30 will generally be constructed of a plastic or other man-made material, but either or both can also be constructed of a cotton, wool or other natural material. Alternatively, both filter membrane 28 and inner medium 30 can be constructed of a blend of two or more materials, whether natural or man-made.

Housing 12 is also configured with a small recess 32 adjacent discharge port 18 in its back side 34. This recess 32 is configured to catch and collect any fluid that may drain from filter 14 during its replacement operation. One may think of recess 32 as a small sump or well in back side 34 since it is the deepest portion of that side of housing 12.

Figure 2:
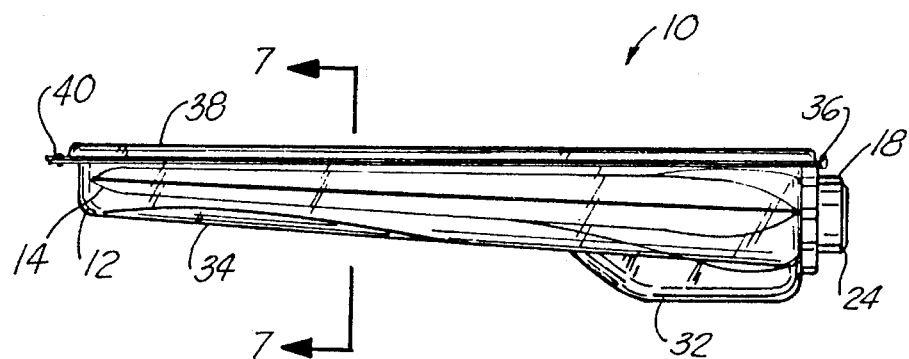
FIG. 2 is a left side elevational view of the invention, the opposite view being a mirror image thereof.
Figure 3:
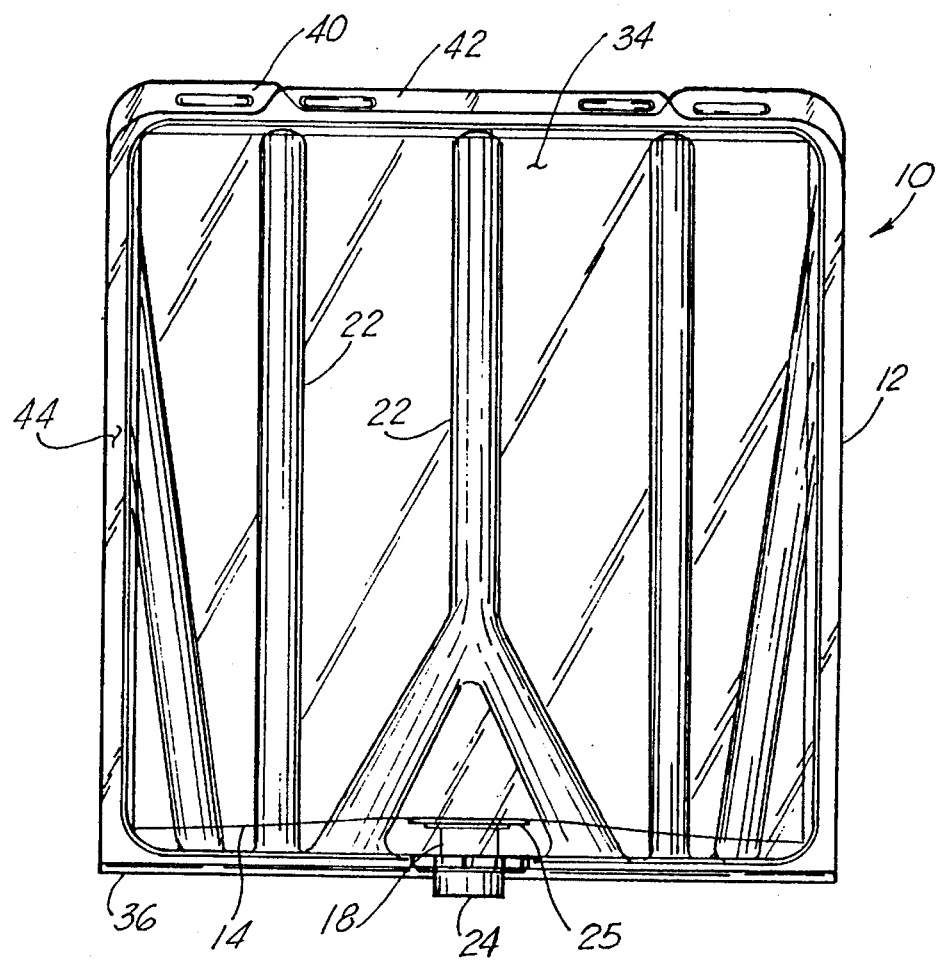
FIG. 3 is a rear elevational view of the invention.
Figure 4:
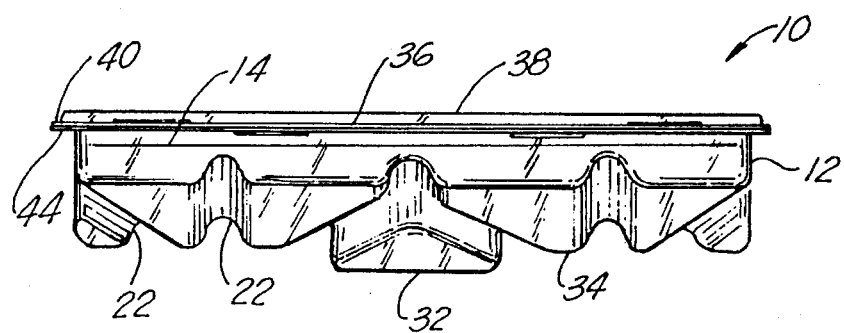
FIG. 4 is a top, plan view of the invention.
Figure 5:
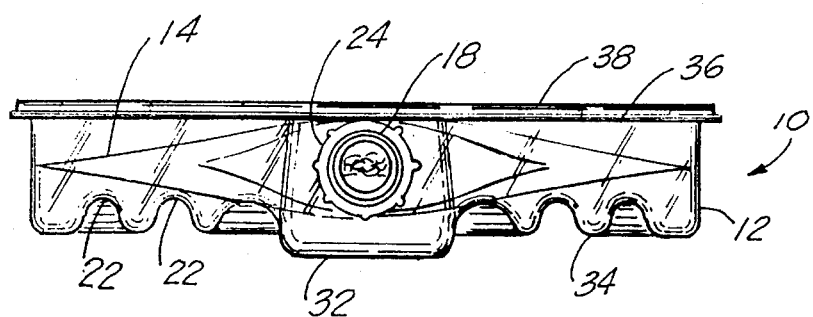
FIG. 5 is a bottom, plan view of the invention.
Figure 6:
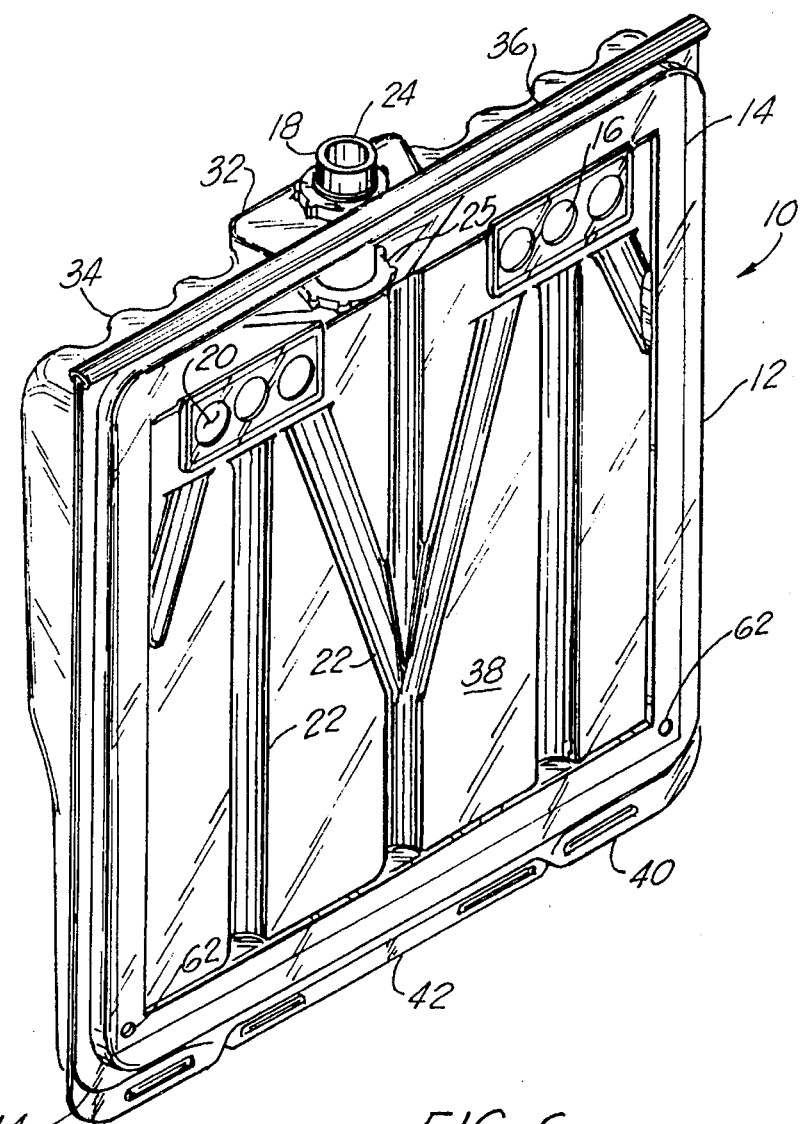
FIG. 6 is a front, right side and bottom perspective view of the invention.

Referring now specifically to FIG. 2, there is shown hinge 36 along the top of housing 12 that permits front side 38 of housing 12 to pivot with respect to back side 34 of housing 12. This ability of front and back sides 38 and 34 to pivot with respect to each other permits access to the interior of housing 12 thereby providing access to filter 14. Hinge 36 would generally run across the top of housing 12 and would be constructed of the same material as housing 12. A lip 40 will preferably run along the remaining three sides of front side 38 so as to make it easier to separate front side 38 from back side 34. As shown in FIG. 1, a tab 42 may also be formed in back side 34 which extends above or beyond lip 40 so as to further ease the separation of front side 38 from back side 34.

Referring now to FIG. 7, there is shown a cross-section of filter system 10. This cross section illustrates the configuration of lip 40 of front side 38 as well as corresponding lip 44 extending along back side 34. FIG. 7 also illustrates the configuration of notches 22 and the channels that are formed therebetween. Also illustrated is a sectional view of filter 14 showing its outer membrane 28 and inner medium 30 that retains the shape of outer membrane 28. As indicated, filter 14 is retained between opposite notches 22 in front and back sides 38 and 34 of housing 12. Arrows 46 illustrate the fluid flow through filter 14 from the cavity within housing 12.

Figure 8:
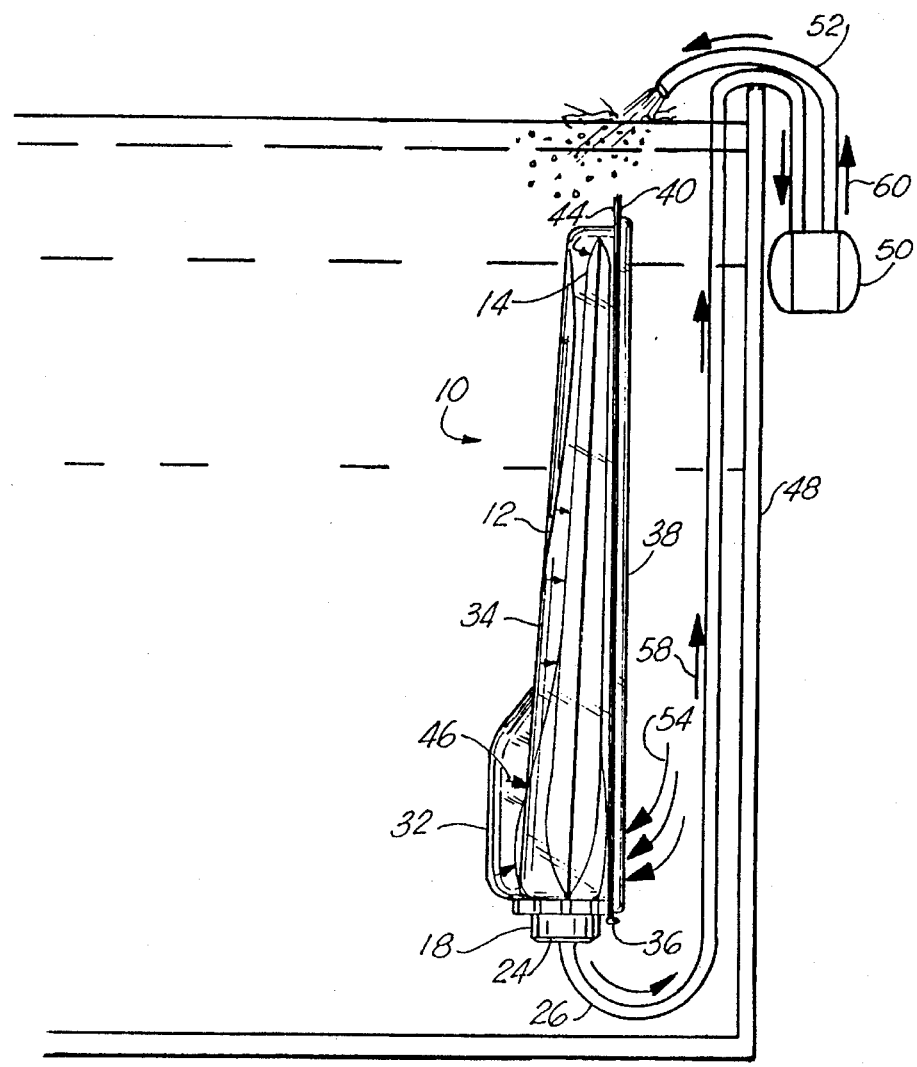
FIG. 8 is a left side elevational view of the invention as it would be installed within a tank illustrating its operation.

Referring now to FIG. 8, the operation of filter system 10 is shown in greater detail. As indicated, filter system 10 is installed within a tank or other container 48. Generally, a base or bracket (not shown) would be used for the installation of filter system 10 within tank 48. Filter system 10 is installed, as shown, with both discharge port 18 and recess 32 adjacent the bottom of tank 48. Preferably, front side 38 of housing 12 would face the wall of tank 48 while back side 34 and recess 32 would face outward. One end of tubing 26 would be secured to discharge port 18 in the normal fashion while the other end would be secured to the intake of pump 50. One end of a second tubing 52 would be secured to the discharge of pump 50 while the other end of this tubing 52 would be positioned so as to discharge into tank 48.

Figure 9:
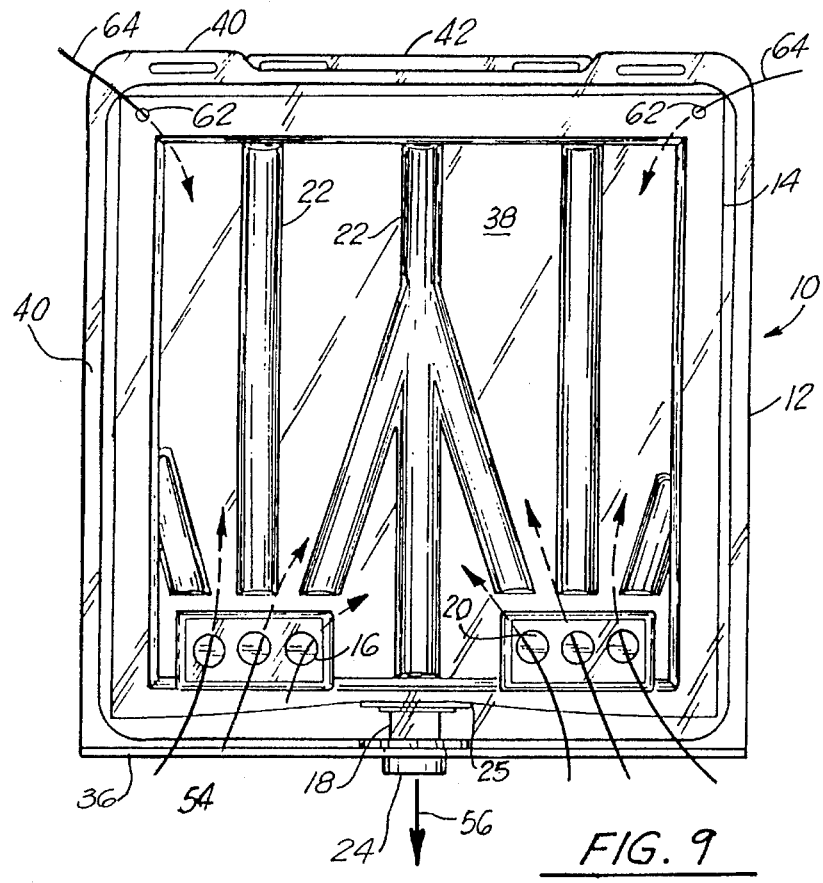
FIG. 9 is a front elevational view of the invention illustrating its operation; and, FIG. 10 is a front elevational view of the invention, partially cut away, illustrating its operation.
Figure 10:
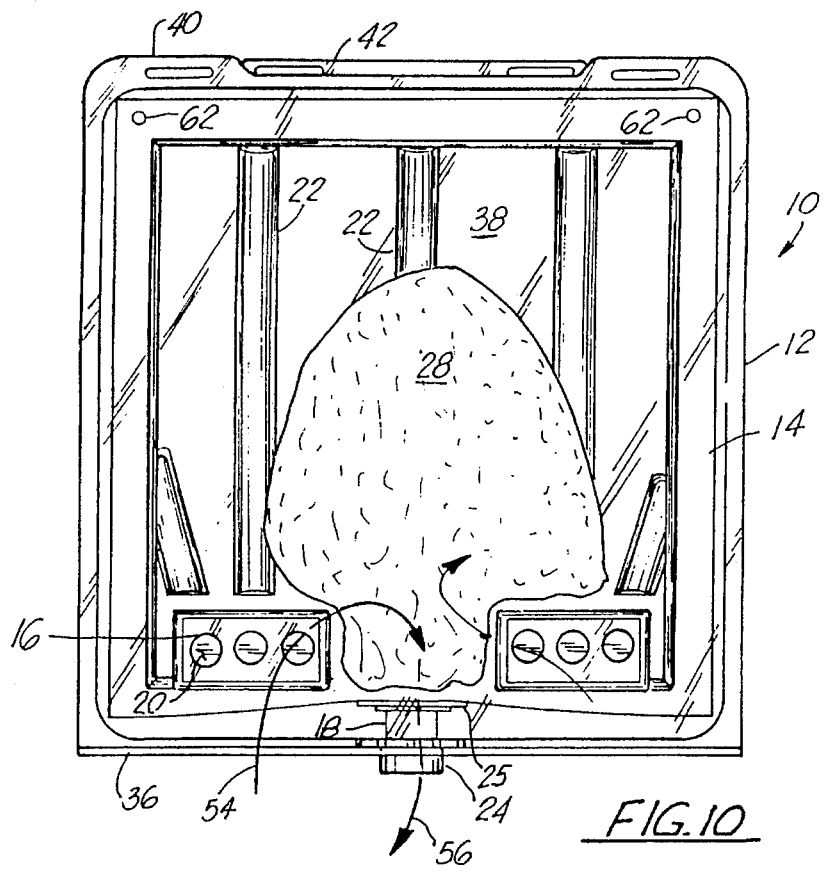

Referring now to FIGS. 8–10, during operation, fluid as indicated by arrows 54 would be drawn into intake openings 16 in front side 38 of housing 12. This fluid would pass across flap or check valve 20 to enter the interior cavity of housing 12. Once inside housing 12, the fluid would travel along one of the channels defined between notches 22. This fluid would then enter filter 14 as indicated by arrows 46 of FIG. 7 thereby becoming filtered and leaving any entrained contaminant on outer membrane 28. Once inside filter 14, the fluid may be further filtered via inner medium 30 as it travels downward to exit via discharge port 18 as indicated by arrow 56. After passing through discharge port 18, this now cleaned fluid passes through tubing 26 as shown by arrows 58 toward pump 50. This pump 50 then discharges such cleaned fluid through tubing 52 back into tank 48 as indicated by arrows 60. As long as pump 50 is operating, this filtering process will occur.

Also shown in FIGS. 9 and 10 are small openings 62 in the upper corner regions of front side 38 opposite hinge 36. These small openings 62, while permitting fluid to be drawn into housing 12 as indicated by arrows 64 during operation, further serve to permit air to escape from within housing 12 when such housing is first submerged within tank 48. This release of air from within housing 12 will prevent such air from being drawn into pump 50 during operation thereby possibly causing damage to pump 50.

As stated earlier, filter 14 is removable and replaceable. This is accomplished by removing housing 12 from within tank 48 for access purposes. Tubing 26 would also most likely be uncoupled from discharge port 18 but this is not always necessary. The step of removing housing 12 from tank 48 would cause most of the fluid within housing 12 to drain out discharge port 18 while small openings 62 would act as vents for this purpose. Housing 12 would then be placed in a horizontal position with front side 38 upward thereby allowing any fluid remaining within housing 12 to drain toward and collect within recess 32. Tab 42 and/or lip 40 would then be used to separate front side 38 from back side 34 so as to provide access to filter 14. Filter 14 would then be disconnected from discharge port 18, such as via a friction fitting or by un-threading, and replaced with a new one. Generally, filter 14 would also be constructed with a fitting of some kind that would match that of discharge port 18. Once the new filter 14 is secured to discharge port 18, housing 12 is closed and re-submerged within tank 48. The air within housing 12 would be vented via small openings 62 thereby allowing the interior of housing 12 to fill with fluid prior to the operation of pump 50.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A filtering apparatus for filtering a fluid comprising:
   (a) an openable housing enclosing a filter means therein;
   (b) at least one intake opening provided in said housing for the passage of fluid therethrough;
   (c) means for allowing fluid flow through said at least one intake opening and into said housing only, thereby preventing flow out of said housing;
   (d) channel means formed in said housing for directing fluid flow within said housing;
   (e) said filter means comprising an outer filter member and an inner mesh through which the fluid flows; and,
   (f) a discharge port coupled to said openable housing and said filter means, said discharge port extending out of said housing and comprising a coupling at its distal end for coupling to a pump, for providing fluid flow through said intake openings and into said housing and then through said filter means and then out of said housing through said discharge port.

2. The apparatus as set forth in claim 1, wherein when said housing is uncoupled from said discharge port, said filter means is removable and replaceable within said housing.

3. The apparatus as set forth in claim 2, wherein said housing is hinged for access to said filter means.

4. The apparatus as set forth in claim 3, wherein said hinge extends along one side of said housing.

5. The apparatus as set forth in claim 3, wherein said housing is transparent for an unobstructed view of said filter means.

6. The apparatus as set forth in claim 5, wherein said housing further comprises lip means along at least one side thereof for opening said housing and for providing access to said filter means.

7. The apparatus as set forth in claim 6, wherein said housing further comprises a recess for collecting fluid therein.

8. The apparatus as set forth in claim 7, wherein said inner mesh biases said outer filter member and prevents it from collapsing.

9. The apparatus as set forth in claim 8, wherein said housing further comprises air vent openings therein in an upper region thereof for the passage of air therethrough when said housing is initially submerged in said fluid.

10. The apparatus as set forth in claim 9, wherein said intake and said vent openings are positioned in a first side of said housing and wherein said recess is positioned in an opposite side of said housing adjacent said discharge port.

11. A method of filtering a fluid comprising the steps of:
    (a) enclosing filter means within an openable housing;
    (b) passing fluid through at least one intake opening provided in said housing;
    (c) allowing fluid flow through said at least one intake opening and into said housing only, thereby preventing flow out of said housing;
    (d) directing fluid flow within said housing via a channel assembly formed in said housing;
    (e) passing fluid through an outer filter member of said filter means and causing this fluid to travel within said filter means through an inner mesh; and,
    (f) coupling a discharge port to said openable housing and said filter means, said discharge port extending out of said housing and comprising a coupling at its distal end for coupling to a pump, for providing fluid flow through said intake openings and into said housing and then through said filter means and then out of said housing through said discharge port.

12. The method as set forth in claim 11, wherein when said housing is uncoupled from said discharge port, said filter means is removable and replaceable within said housing.

13. The method as set forth in claim 12, further comprising the step of providing said housing with a hinge for access to said filter means.

14. The method as set forth in claim 13, further comprising the step of extending said hinge along one side of said housing.

15. The method as set forth in claim 13, further comprising the step of providing said housing of a transparent material for an unobstructed view of said filter means.

16. The method as set forth in claim 15, further comprising the step of providing said housing with a lip assembly along at least one side thereof for opening said housing and for providing access to said filter means.

17. The method as set forth in claim 16, further comprising the step of providing said housing with a recess for collecting fluid therein.

18. The method as set forth in claim 17, further comprising the step of biasing said outer filter member by said inner mesh to prevent said outer filter member from collapsing.

19. The method as set forth in claim 18, further comprising the step of providing air vent openings in an upper region of said housing for the passage of air therethrough when said housing is initially submerged in said fluid.

20. The method as set forth in claim 19, further comprising the step of positioning said intake and said vent openings in a first side of said housing and positioning said recess in an opposite side of said housing adjacent said discharge port.

* * * * *